United States Patent [19]

Lentz et al.

[11] 4,314,006
[45] Feb. 2, 1982

[54] FLEXIBLE DOCUMENT TRANSPORT BELT OF ETHYLENE PROPYLENE DIENE RUBBER

[75] Inventors: James A. Lentz, Penfield; Joseph H. Moriconi, Rochester, both of N.Y.

[73] Assignee: Xerox Corporation, Stamford, Conn.

[21] Appl. No.: 163,443

[22] Filed: Jun. 26, 1980

[51] Int. Cl.³ .................... B32B 25/08; C08D 9/12
[52] U.S. Cl. ............................ 428/494; 428/521; 428/523; 260/23.7 M; 260/27 BB; 271/3
[58] Field of Search ............ 260/23.7 M, 27 BB; 428/494, 521, 523; 271/3

[56] References Cited

U.S. PATENT DOCUMENTS 3,634,352  1/1972  Mueller et al. ........... 260/23.7 M X
3,931,090  1/1976  Amatangelo ................ 260/23.7 M
4,028,483  6/1977  Bond, Jr. et al. ......... 260/23.7 M X

FOREIGN PATENT DOCUMENTS 50-16729  2/1975  Japan .......................... 428/523

Primary Examiner—P. Ives

[57] ABSTRACT

A document transport belt for use in an automatic document handler in an electrostatographic copying machine is provided, which is made from an ethylene propylene diene rubber. The document transport belt of the invention has a stable coefficient of friction, high resistance to ozone attack, superior whiteness stability, high resistance to abrasion, and outstanding mechanical stability so that it does not require the frequent tension adjustment after operating under machine conditions for a period of time.

7 Claims, 3 Drawing Figures

FLEXIBLE DOCUMENT TRANSPORT BELT OF
ETHYLENE PROPYLENE DIENE RUBBER

BACKGROUND OF THE INVENTION AND PRIOR ART STATEMENT

This invention relates to a document transport belt, and more particularly to a document transport belt suitable for use in an automatic document handler in an electrostatographic copying machine.

Frequently, it is necessary to feed single sheets of paper from a stack in rapid sequence, for example, in order to more fully utilize the high speed copying capabilities of modern reproduction or copying machines, it is desirable to employ an automatic document handler for placing original documents to be copied on the platen of the reproduction machine, and to remove them from the platen after the copying process, to minimize delays associated with manual steps carried out by operators. To accomplish this function, the automatic document handler must first separate the document to be copied from others awaiting copying. Then, the separated document is forwarded to the machine platen, properly located or registered thereon, copied and removed from the platen to enable succeeding copies to be placed on the platen.

In such a process, the document to be copied must be rapidly separated from the stack of documents in the document supply tray; multiple fed documents must be separated from the desired document and returned to the document tray; the single document must be forwarded to the platen and registered thereon; and after copying, removed therefrom. This entire process must be accomplished rapidly to remove the copied document to place the succeeding document on the platen preferably between copy cycles of the machine. In high speed machines capable of producing more than one copy a second, it is difficult to carry out the entire document handling process between copy cycles. However, an automatic document handler should be able to accomplish the steps of removing one document and placement of a succeeding document on the platen in less than one second. At such a speed, rapid acceleration and positive feeding of the document is imperative. Nevertheless, the document handler must also be designed to produce minimal wear and tear on the documents, prevent misfeeds or multifeeds, and minimize jams to prevent damage to the documents which may be irreplaceable.

In addition to the requirements associated with the rapid positioning of a document and its subsequent removal from the platen, a document feed belt in an automatic document handler, frequently provides the background or framework for the document to be copied. Generally, at least a portion of the document feed belt overlays the platen and thus forms the backdrop for the document being copied. Accordingly, it is desirable that the document feed belt be white or as nearly white as possible. However, conventional materials which may be used for the document feed belt, such as conventional rubbers, tend to undergo mechanical degradation resulting from mechanical stress due to high speeds of operation. Moreover, many conventional materials are easily degraded by oxidation at elevated operating temperatures. Degradation by oxidation is particularly pronounced in high speed modern copying machines in which ozone is generated by corona charging devices operating at high capacities. The mechanical and chemical degradation of document feed belts are frequently visible in such characteristics as surface cracking, tackiness of the surface, and dirt pickup or discoloration of the initially white document feed belt.

A further problem associated with prior art document feed belts made of such materials as conventional rubbers resides in the fact that such prior materials tend to be relatively easily abraded and hence, has relatively short life.

In U.S. Pat. No. 3,482,676, there is disclosed a document feed belt which is made of two layers, an inner layer of flexible electrically conductive material such as graphite impregnated rubber, and an outer layer of a flexible light reflective materials such as white neoprene. The inner layer of electrically conductive material will assist in the dissipation of undesired static electrical charge on the belt while the white outer layer will provide a clean background for the document being copied.

U.S. Pat. Nos. 3,829,082, 3,889,943 and 3,941,376, all disclose automatic document handlers which utilize platen transport belt or document feed belt. For construction of such belts, all three of these patents refer to the belt construction disclosed in said patent 3,482,676.

In U.S. Pat. No. 3,889,942, there is disclosed a device for facilitating the feeding of documents into a reproduction machine, which includes a curved entry sheet or strip for holding the sheets in aligned position and for flatening curls or undulations in the sheets. The curled strip is made of a transparent plastic or Mylar.

In U.S. Pat. No. 3,931,090, there is disclosed a highly reversion resistant polyisoprene elastomer composition vulcanized with a low sulfur content for use in paper feed belts. The low sulfur vulcanizate of isoprene provides high resistance to physical degradation due to dynamic mechanical stress under operating conditions.

Finally, in U.S. Pat. No. 4,023,791, there is disclosed a semi-automatic document feeder for use with a photocopying machine, in which a plurality of drive belts form a conveyor loop. The belts of this patent are made of cloth-based neoprene or of cloth-based synthetic rubber.

Although the document feed belts of the prior art have provided satisfactory service, there is a need for improved document feed belts which have stable and controllable coefficient of friction for dependable feeding of documents, high resistance to ozone attack, whiteness stability to provide a clean background for the document to be copied, superior mechanical properties including resistance to abrasion, surface cracking, and dirt pickup.

It is, therefore, an object of the present invention to provide an improved document feed belt for use in automatic document handlers.

It is another object of the present invention to provide an improved document handling apparatus in which the document feed belt has improved mechanical stability, improved resistance to ozone attack, and improved whiteness stability.

These and other objects of the invention will be apparent from the following disclosure.

SUMMARY OF THE INVENTION

The above objects are accomplished in accordance with the present invention by a document handling apparatus in which the document transport belt is made from an ethylene propylene diene rubber. The ethylene propylene diene rubber is particularly suited for the purposes of a document transport belt in that it has a stable coefficient of friction, high resistance to ozone attack, superior whiteness stability, high resistance to abrasion, and outstanding mechanical stability so that it does not require the frequent tension adjustments after operating under machine conditions for a period of time.

DETAILED DESCRIPTION OF THE INVENTION

Figure 1:
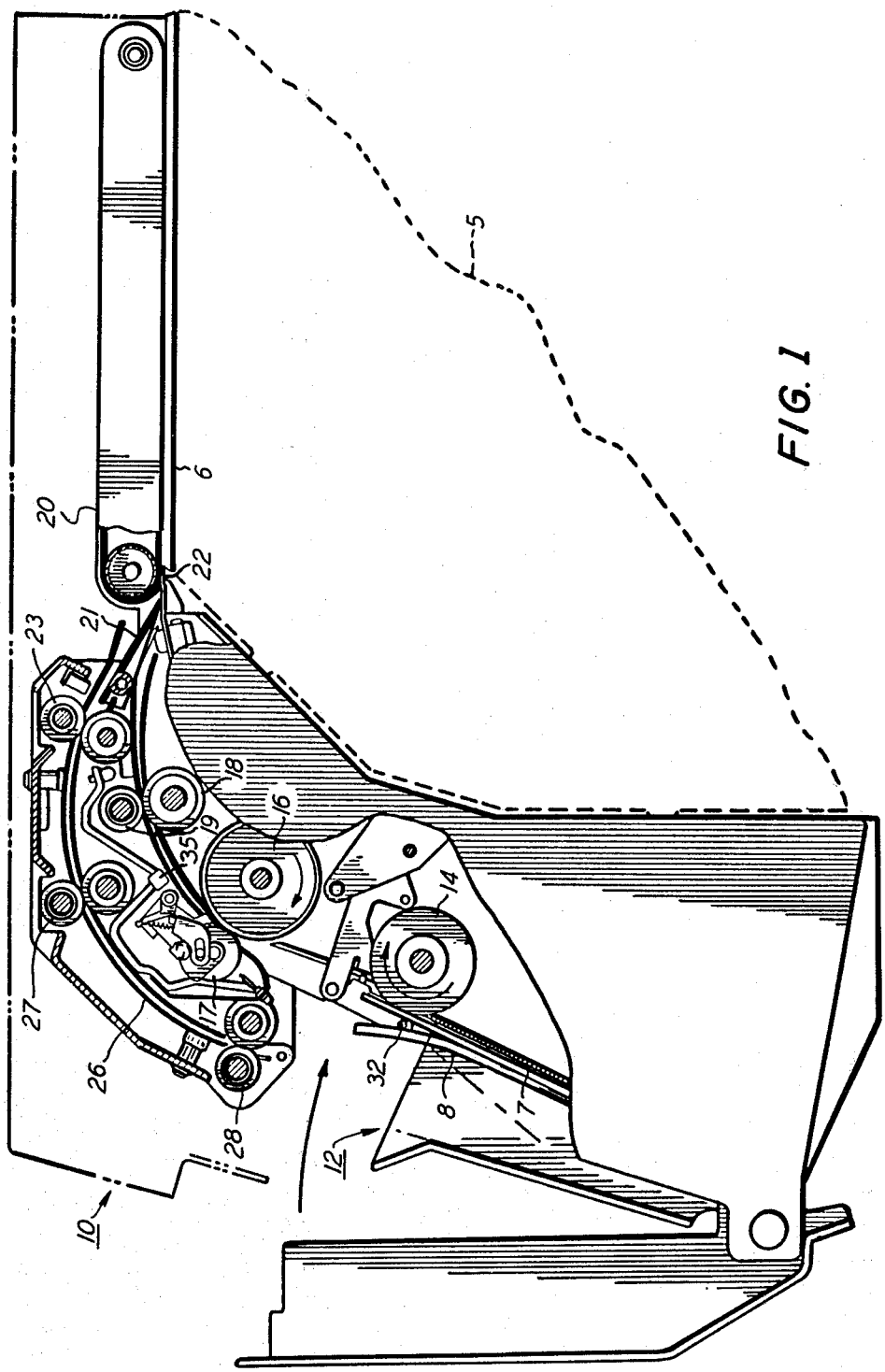
FIG. 1 is a side view in cross section showing a document handler incorporating the improved document transport belt of the present invention in operative association with the document reproduction machine.

Referring to FIG. 1, there is shown a document handler designated generally by 10 incorporating the improved document transport belt of the present invention. The document handler 10 may be used with any suitable document processing apparatus, such as a reproduction machine 5 which is provided with a platen 6 on which the document to be copied is placed.

Document handling apparatus 10 includes a supply tray 12 for storing both documents 7 to be copied and documents 8 which have been copied. From tray 12, one or more documents are advanced from the bottom of supply 7 by an intermittently operated primary feed roller 14 into the nip of the retard roll pair 16 and 17. The lower roll 16 is driven in a document feeding direction (as shown by the arrow in FIG. 1) while the upper roll 17 is driven in the reverse or document reject direction by a suitable slip coupling (not shown).

Frictional engagement between roll 16 and 17 normally provides sufficient driving force on roll 17 to override the drive input to roll 17 (i.e. the coupling slips) and thereby allows roll 16 to turn roll 17 in the document feeding direction. Further detailed explanation of the cooperative working arrangement between roll 16 and 17 may be found in U.S. Pat. No. 3,885,782, the disclosure of which is hereby incorporated by reference.

The document emerging from retard roll pair 16 and 17 passes into the nip of intermediate roll pair 18 and 19, and from there underneath deflector plate 21 to document transport belt 20. Document transport belt 20, in the form of a endless conveyor belt, first carries the document forward onto platen 6 until the entire document is positioned thereon. Document transport belt 20 is then reversed to bring the document trailing edged against register 22. Register 22 locates the document in copying position following which the copy or copies are made by the reproduction apparatus 5.

When copying is completed, document transport belt 20 is again started in reverse to remove the document backwards off the platen 6, register edge being previously retracted for this purpose. Deflector 21, which was previously lowered, guides the returning document upwardly into the nip of return roll pair 23. Roll pair 23 moves the document along suitable return guides 26 through second and third return roll pairs 27 and 28, respectively, and back into tray 12.

To maintain copied documents 8 segregated from the documents 7 awaiting copying, and to prevent inadvertent or premature refeeding of the returned documents 8 by feed roll 14 following feeding of the last one of the documents 7, a displaceable bail or separator bar 32 is provided. Bail 32 is disposed substantially opposite to and above primary feed roll 14 to prevent documents resting thereon from contacting roll 14. The bail 32 is biased against primary feed roll 14 by suitable springs to force the documents being fed against roll 14 and provide frictional engagement between roll 14 and the document resting thereagainst for positive feeding of the document by the roll 14.

Figure 2:
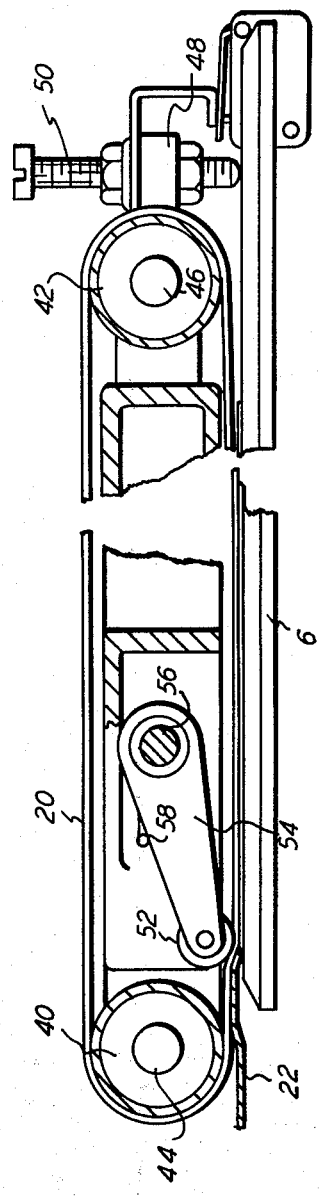
FIG. 2 is a side view showing the document transport belt of FIG. 1 in further detail.

Referring to FIG. 2, the document transport belt 20 is stretched about drive and idler roll pair 40 and 42. Rolls 40 and 42 being arranged on opposite sides of platen 6 with the axis of roll 40 being above register 22 while that of roll 42 is above the far side of platen 6. Roll shafts 44 and 46 are rotatably supported in sides (not shown) of the platen transport mechanism. The sides each carry a projection 48 adjacent idler roller 42 for receiving adjustable stop screws 50 therein. The stops 50 may be adjusted to provide the required spacing of the document transport belt above the surface of the platen. The dimension and mounting of the belt support roll pair 40 and 42, and the adjustment of screw 50 is such that the surface of the document transport belt 20 therearound is spaced slightly above the level of platen 6 as seen in FIG. 2. An internal pressure roll 52 is provided which engages document transport belt 20 proximate the inlet to platen 6 to force the belt 20 against register 22 when register 22 is in the up position.

It may be seen from FIG. 2 that the pressure roll 52 does not force the belt 20 into contact with the platen adjacent register 22. Roll 52 is rotatably supported by arms 54 which in turn are pivotally carried from cross shaft 56. Shaft 56 is supported in the sides of the platen transport mechanism (not shown). Springs 58 force arms 54 and pressure roll 52 downwardly such that the roll 52 forces a line portion of the belt 20 into contact with the upper edge of register 22. As a result, a line-like portion of the document transport belt 20 normally rides against the edge of register 22 to provide a nip force therebetween for driving the documents onto the platen 6. Adjustable stops 50 are adjusted such that the document transport belt 20 adjacent roll 42 is spaced from the platen 6 but sufficiently close thereto such that normal sag of the document transport belt 20 contacts the platen glass in a central area relative to rolls 52 and 42. By this arrangement, a positive driving force is provided between the belt and the register edge to drive documents onto the platen while an absolute minimum force between the belt and the platen glass is provided to force the documents against the registration edge when the platen belt is reversed for registering the document, thereby providing minimal wear and tear on the document to be copied.

Figure 3:
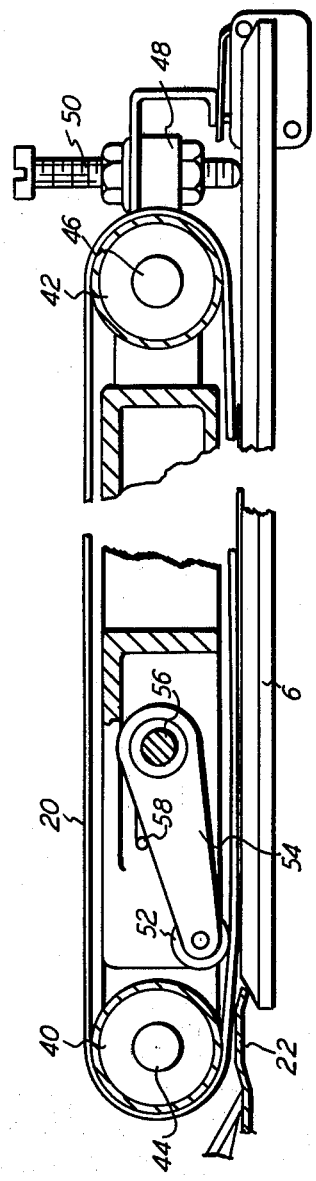
FIG. 3 is a side view showing further details of the document handling apparatus incorporating the improved document transport belt of the present invention.

Referring to FIG. 3, which illustrates the platen transport device of FIG. 2 with the register 22 in the down position, it can be seen that roll 52 is allowed to drop downwardly toward the platen 6 to force the belt 20 into positive engagement with the lead edge of the document thereon to provide sufficient force between the document transport belt 20 and the document for positively driving the document off from the platen preparatory to the placement of the succeeding document.

As indicated above, the improved document transport belt of the present invention is made from an ethylene propylene diene terpolymer rubber known as EPDM. EPDM may be obtained from various suppliers, with the material we used being obtained from the E.I. duPont Company under the trade designation Nordel 1440. We preferred to cure the EPDM in a free-radical crosslinking system comprising a free radical initiator. Exemplary of such a system is a peroxide curing system. Examples of free radical initiators are dicumyl peroxide, benzoyl peroxide, and di-t-butyl peroxide.

It is preferred that the ethylene propylene diene terpolymer rubber (EPDM) be cured in a process in which the free radical crosslinking is carried out in the presence of a co-agent which is a reactive monomer itself and which adds to the polymer radical formed by the free radical initiator. This type of coagent promotes trimolecular crosslinking. Triallyl cyanurate and triallyl isocyanurate are examples of such coagents which promote trimolecular crosslinking, that is which join three, rather than merely two, polymer chains together. Examples of other coagents include trifunctional acrylates such as trimethyl propane trimethacrylate, and the trifunctional organosiloxanes. Triallyl cyanurate and triallyl isocyanurate are preferred coagents for the purposes of the present invention.

The basic mechanism for the free radical crosslinking used in the curing of the terpolymer rubber in accordance with the present invention is well known in the art. Although we do not wish to be bound by any particular theory of such crosslinking reaction, it appears that the peroxide thermally decomposes homolytically to form free radicals which then react with the polymer by addition or abstraction to form radicals on the polymer backbone. The two polymer radicals can then combine to form the desired, thermally stable carbon-carbon bonds. Since polymer free radicals are energetic, and many polymers (particularly polypropylene and propylene copolymers) will undergo chain scission or cleavage reactions leading to molecular weight reductions and property loss, in preferred embodiments certain coagents may be used to prevent or to take advantage of this energetic activity of the free radicals. The function of the coagents is to increase the efficiency of the crosslinking reaction by adding to the polymer radical favoring trimolecular crosslinking. The coagent then becomes a part of the polymer chain. When triallyl cyanurate or triallyl isocyanurate is used as the coagent, about 0.5 to 3 parts, and preferably about 2 to 2.5 parts, by weight of the coagent may be used per 100 parts of EPDM. We particularly prefer to use about 2 parts of the coagent, based on 100 parts by weight of EPDM.

Plasticizers may be used in the synthetic rubber compositions for making the document feed belt of the present invention. Petroleum-based process oils are commonly used for this purpose. Generally, about 0 to 65 parts, and preferably about 0 to 50 parts, by weight plasticizer based on 100 parts by weight of EPDM may be used. We particularly prefer to use about 10 parts by weight of a petroleum derivative oil, based on 100 parts by weight EPDM.

It is contemplated that a stabilizer will be used in the rubber composition for making the document feed belt of the present invention. In this respect, zinc oxide long has been known as an outstanding additive for preventing heat degradation of natural and synthetic polymers. About 2.5 to 20 parts, and preferably about 5 to 10 parts, by weight zinc oxide based on 100 parts by weight EPDM may be used. We particularly prefer to use about 5 parts by weight zinc oxide per 100 parts by weight EPDM.

Various fillers and/or reinforcing agents may be added to increase the strength and integrity of the rubber composition for making the document feed belt of the present invention. An example of a reinforcing agent is silica. Silica may be used in the present composition in amounts from about 0 to 80 parts, and preferably about 40 to 60 parts, by weight based on 100 parts of EPDM. We particularly prefer to use about 45 parts by weight silica based on 100 parts of EPDM. Hydrated aluminum oxide, for example $Al_2O_3 \cdot 3H_2O$ available from the Alcoa Company under its trade designation Hydral 710, may be used as the filler in the composition for making the present document feed belts. About 0 to 75 parts, and preferably about 50 to 75 parts, by weight of filler may be used per 100 parts by weight EPDM. We particularly prefer to use about 50 parts of hydrated aluminum oxide, based on 100 parts of EPDM.

A calendering agent may be used in the composition for making the present document feed belt. An example of a calendering agent which also has plasticizing effect on the rubber composition is zinc methacrylate. When zinc methacrylate is used as a calendering-plasticizing agent, about 0.25 to 5 parts by weight, based on 100 parts of EPDM, may be used. We prefer to use about 0.5 to 2.5 parts and particularly prefer to use about 1.5 parts by weight zinc methacrylate per 100 parts of EPDM.

A mold release lubricant may be used in the rubber composition for making the document feed belt of the present invention. An example of a mold release lubricant is zinc stearate. When zinc stearate is used as a mold release lubricant, about 0.25 to 2 parts by weight may be used based on 100 parts of EPDM. We prefer to use 0.5 to 1.5 parts, and particularly prefer to use about 1 part, by weight zinc stearate per 100 parts of EPDM.

A whitening agent or whitener for the rubber composition for making the present document feed belt is needed. About 2 to 20 parts by weight of titanium dioxide, based on 100 parts of EPDM is suitable for the purposes of the present invention. We prefer to use about 5 parts titanium dioxide per 100 parts of EPDM.

We prefer to use dicumyl peroxide as the free radical initiator or curing agent. When dicumyl peroxide is used, we prefer to use about 4 to 12 parts and particularly prefer to use about 8 parts, based on 100 parts of EPDM.

The invention will be further illustrated with the following specific examples.

EXAMPLE I

A document feed belt was made by curing the following composition in a mold for an endless belt loop. 100 parts by weight of EPDM, supplied by the duPont Company under its tradename Nordel 1440, were mixed with: 10 parts by weight of a petroleum-based oil from the Sun Oil Company under its tradename Sunpar 2280, as a plasticizer; about 50 parts of a hydrated aluminum oxide as a filler (Hydral 710 from Alcoa); about 45 parts by weight of a reinforcing agent, a silica obtained from the Pittsburgh Plate Glass Company under its tradename Silene D; about 5 parts by weight of a titanium dioxide whitener, obtained from the G & W Natural Resources Group under its tradename RF-2; about 1 part by weight zinc stearate as a mold release lubricant; about 5 parts by weight of zinc oxide as a stabilizer, obtained from New Jersey Zinc Company under its tradename Protox 166; about 1.5 parts by weight of zinc methacrylate as a plasticizing calendering agent; about 2 parts by weight of triallyl cyanurate as a coagent in the curing system; and about 8 parts by weight of dicumyl peroxide as the curing agent. The composition was cured for 14 minutes at 330° F. The resultant document feed belt was compared with prior art document feed belts with respect to several important characteristics. It was found that the document feed belt of the present invention to have superior relaxation properties. When the document feed belt of the present invention is wrapped around two rolls at a tension of about 14 pounds per side, or a total of 28 pounds, which is the normal operating tension for this belt, the belt relaxes to a tension of 12 to 13 pounds per side within a day, after which the relaxation stops and the tension on the belt remained substantially constant. This gives the belt good document handling performance without requiring the intermittent or periodic tension adjustments required by the prior art document feed belts due to continued relaxation of the belts. The prior art belt required more tension for operation, and it was adjusted to 24 pounds per side or a total of 48 pounds. This tension was dropped to 12 to 14 pounds per side, apparently due to the relaxation in the belt, after about 130,000 document feeds. This lower tension must be adjusted by a serviceman for proper operation. The Taber abrasion resistance of the document feed belt of the present invention is also substantially superior to that of the prior art belts. The document feed belt of the present invention has greatly increased resistance to ozone as compared to the document feed belts of the prior art. In simulated tests in relatively high ozone atmosphere, at 0.6 parts per million ozone, similar to the atmosphere which may be encountered in the interior of some modern, high speed copier/duplicator equipment, the document feed belts of the prior art would develop cracks and even complete breaks after running for less than about 22 hours, whereas the document feed belts of the present invention have been tested for over 250 hours of operation under the same conditions without developing any visible defects. The superior Taber abrasion resistance and ozone resistance of the document feed belt of the present invention combined to make the machine life of the belt substantially longer than the machine life of the prior art belts. Finally, the prior art sulfur-cured document feed belts turned yellow with time, due to the presence of sulfur in the rubber composition, whereas the document feed belt of the present invention retained its whiteness and thus provided a better background for the documents to be copied.

EXAMPLE II

Several different formulations were prepared according to the procedure of Example I. The formulations were:

TABLE I

| Ingredients | Formulations | | | | |
|---|---|---|---|---|---|
| (parts by weight) | A | B | C | D | E |
| Nordel 1440 | 100 | 100 | 100 | 100 | 100 |
| Zinc Oxide | 5 | 5 | 5 | 5 | 5 |
| Zinc Stearate | 1 | 1 | 1 | 1 | — |
| Zinc Methacrylate | 1.5 | 1.5 | 1.5 | 1.5 | 1.5 |
| Hydral 710 | 50 | 50 | 50 | 50 | 50 |
| Silene D | 45 | 25 | 45 | 45 | 45 |
| Titanium Dioxide | 5 | 5 | 5 | 5 | 5 |
| Triallyl Cyanurate | 2 | 2 | 2 | 2 | 2 |
| Sunpar 2280 | 10 | 10 | 10 | 10 | — |
| Dicumyl peroxide | 8 | 8 | 5.25 | — | 5.25 |
| N-butyl 4,4-bis(t-butyl peroxy valerate) | — | — | — | 11 | — |
| Curing time & temperatures | 14 min. 330° F. | 22 min. 330° F. | 27 min. 330° F. | 10 min. 330° F. | 24 min. 330° F. |

The properties of these formulations were found to be:

TABLE II

| Property (parts by weight) | Formulation | | | | |
|---|---|---|---|---|---|
| | A | B | C | D | E |
| Shore A Durometer | 66 | 64 | 66 | 64 | 73 |
| Tensile Strength psi | 1359 | — | 1076 | 1400 | 1440 |
| Ultimate Elongation, % | 254 | — | 268 | 246 | 244 |
| Elastic Modulus, 5% strain, psi | 872 | 724 | 1062 | 1054 | 1418 |
| Tear, Die C, lbs/in | 146 | — | 132 | 157 | 160 |
| 100% Modulus (tensile) psi | 563 | — | 446 | 670 | 710 |
| Tensile Stress Relaxation, 100° F. % decay/log cycle time | 3% | 3.8% | 5.1% | 4.4% | 5.0% |
| Compression set, 22 hrs at 185° F., 25% deflection, (%) | 3.9 (buttons) | 4.5 (buttons) | 6.0 (buttons) | 4.9 (buttons) | 3.6 buttons) |
| Environmental Stability | excellent | excellent | excellent | excellent | excellent |
| U.V. Resistance | excellent | excellent | excellent | excellent | excellent |
| Reflectance: 450-700 NM, % | >75 | >75 | >75 | >75 | >75 |
| after 4 hrs. U.V., % | >75 | >75 | >75 | >75 | >75 |
| Coefficient of friction | 1.45 | 1.55 | — | — | — |

While the invention has been described in detail with reference to specific and preferred embodiments, it will be appreciated that various modifications may be made from the specific details without departing from the spirit and scope of the invention.

What is claimed is:

1. In a document handling apparatus, for moving documents into and out of copying position on the platen of a document copying machine, having a flexible document transport belt therein, the improvement which consists essentially of making said belt from an ethylene propylene diene rubber having a relatively stable coefficient of friction and having a relatively high resistance to attacks by environmental elements.

2. The document handling apparatus of claim 1 wherein the ethylene propylene diene rubber is cured with dicumyl peroxide.

3. The document handling apparatus of claim 1 wherein the ethylene propylene diene rubber is cured in a system further comprising a coagent to assist the crosslinking reaction.

4. The document handling apparatus of claim 3 wherein the coagent is triallyl cyanurate or triallyl isocyanurate.

5. The document handling apparatus of claim 1 wherein said belt is made from a composition comprising: 100 parts by weight ethylene propylene diene rubber; about 0 to 65 parts by weight of a petroleum based oil plasticizer; about 0 to 75 parts by weight of a filler; about 0 to 80 parts by weight of a reinforcing agent; about 2 to 20 parts by weight of a whitening agent; about 0.25 to 2.0 parts by weight of a mold releasing lubricant; about 2.5 to 20 parts by weight of a stabilizer; about 0.25 to 3 parts by weight of a plasticizing and calendering agent; about 0.5 to 3 parts by weight of a coagent for curing; and about 4 to 12 parts by weight of a curing agent.

6. The document handling apparatus of claim 5 wherein said filler is hydrated aluminum oxide, said reinforcing agent is silica, said whitening agent is titanium dioxide, said mold releasing lubricant is zinc stearate, said stabilizer is zinc oxide, said plasticizing and calendering agent is zinc methacrylate, said coagent is triallyl cyanurate, and said curing agent is dicumyl peroxide.

7. The document handling apparatus of claim 5 wherein said belt is made from a composition comprising: 100 parts by weight ethylene propylene diene rubber; about 10 parts by weight of a petroleum based oil plasticizer; about 50 parts by weight hydrated aluminum oxide; about 45 parts by weight silica; about 5 parts by weight titanium dioxide; about 1 part by weight zinc stearate; about 5 parts by weight zinc oxide; about 1.5 parts by weight zinc methacrylate; about 2 parts by weight triallyl cyanurate; and about 8 parts by weight dicumyl peroxide.

* * * * *